Feb. 3, 1942.     W. J. ZENNER     2,271,673
POWER TRANSMITTING APPARATUS
Filed Sept. 24, 1938     2 Sheets-Sheet 1

FIG. 1

INVENTOR.
WALTER J. ZENNER
BY *J. H. B. Whitfield*
ATTORNEY.

Feb. 3, 1942.  W. J. ZENNER  2,271,673
POWER TRANSMITTING APPARATUS
Filed Sept. 24, 1938  2 Sheets-Sheet 2

INVENTOR.
WALTER J. ZENNER
BY
J.H.B. Whitfield
ATTORNEY.

Patented Feb. 3, 1942

2,271,673

UNITED STATES PATENT OFFICE 2,271,673

POWER TRANSMITTING APPARATUS

Walter J. Zenner, Des Plaines, Ill., assignor to Teletype Corporation, Chicago, Ill., a corporation of Delaware Application September 24, 1938, Serial No. 231,482

24 Claims. (Cl. 178—34)

This invention relates to power transmitting apparatus and particularly to clutch mechanisms characterized by positive engagement when operating and complete disengagement when idle.

The power transmitting apparatus, according to the present invention, was developed particularly in contemplation of use in printing telegraph apparatus, although the scope of its utility is not limited to printing telegraph apparatus but is general in the broader field of power transmission.

Power transmitting clutch mechanism, as used in printing telegraph apparatus, may be divided generally into two classes. One of these classes includes those clutch mechanisms which impart rotation to a driven member through a predetermined cycle invariably. Printing and function performing cam assemblies are examples of driven elements operable in predetermined cycles and these are frequently driven by positive clutch mechanisms comprising driving and driven elements positively interconnected to effect power transmission, and completely separated in order to accomplish arrestment of the driven element. Such clutch mechanisms usually have an external disengagement control element, the location of which may be fixed or variable, as desired, but which does not rotate with either of the clutch elements.

The other class of clutch mechanisms includes those through which rotation is imparted to an element which must be arrestable in any of a plurality of positions, such as a type wheel or other selector controlled rotatable element. It has been an almost universal custom to satisfy the condition of multiple arrestment points by imparting rotation through a friction clutch mechanism, comprising one or more discs associated with the driving shaft, one or more discs associated with the driven shaft and friction discs free of both of the shafts and disposed between driving and driven discs, the entire assembly being under compression furnished by a spring member or a plurality of springs. In this type of clutch mechanism, the driving shaft is always attempting to rotate the driven shaft, the arrestment of the driven shaft by external control being permitted as a result of slippage in the friction clutch mechanism. The load upon the driving shaft is a maximum when the slippage is at maximum and, therefore, the heaviest load is upon the driving shaft during rest condition of the clutch driven mechanism. Thus, it is necessary to employ a more powerful motor than would be required to drive the type wheel or other element through a clutch which is completely disengaged during idle periods and is engaged only when driving the elements to be rotated, such as a type wheel.

A primary object of the present invention resides in the provision of a clutch mechanism which is self-disengaging in any angular position.

Another object of the invention is to provide in a power transmitting mechanism a torque which sets in rotation the driven element of a positive engagement clutch mechanism before engagement of the clutch element occurs.

The invention features a clutch mechanism in which the torque for initially imparting rotation to the driven element is furnished by a spring which is always under a pre-established tension, and which is additionally tensioned at the end of an operation of the driven member by overtravel of the driving member. The invention also features check means for holding the spring under the increased tension afforded by the overtravel of the driving element.

According to one embodiment of the invention, a shaft to which rotation is to be imparted, and which is to be arrested in any of a plurality of positions, such, for example, as a type wheel shaft, has sleeved thereon a continuously rotating gear. The gear has secured thereto a toothed collar. A sleeve toothed for cooperation with the toothed collar is freely and slidably supported upon the shaft, is provided with a ratchet which is engaged by a pawl pivoted on a stationarily mounted pivot for limiting rotation of the sleeve to a single direction, and is keyed to another sleeve which is also free upon the shaft and has a portion disposed inside a clock spring housing. A compression spring acts between the two sleeves to urge the toothed sleeve into engagement with the toothed collar carried by the gear. The clock spring housing is secured to the shaft and contains a helical spring which has one end secured to the housing and the other to the sleeve seated in the housing. The shaft supports a radially directed pin which extends through an aperture in the toothed sleeve, the aperture being proportioned to permit relative rotational movement to a limited extent as between the shaft and the toothed sleeve, and also to permit axial movement of the sleeve upon the shaft. At one end of the aperture a portion of the defining wall thereof is directed obliquely to the axis of the sleeve and this portion, upon being engaged by the radially extending pin carried by the shaft, serves as a cam surface to effect withdrawal of the toothed sleeve from engagement with the collar.

Upon release of the type wheel shaft for operation, the spring sets it in rotation in the proper direction, thus drawing the radially extending pin carried by the shaft out of engagement with the cam surface of the aperture through which it extends. The toothed sleeve being thus relieved from the restraint of the pin, is moved axially of the shaft by its compression spring into engagement with the toothed collar from which it receives positive driving engagement. Upon arrestment of the type wheel shaft, its radially extending pin is arrested but the toothed sleeve continues to rotate with the toothed collar, thus increasing the tension of the helical spring until the disengagement cam surface is brought into engagement with the pin. Thereafter, the toothed sleeve is shifted axially of the shaft as it continues to rotate and eventually is entirely disengaged from the toothed collar, the final stages of rotation after the sleeve has been disengaged from the collar being due to the inertia of the sleeve. The pivoted pawl holds the toothed sleeve after it has come to rest, thus preventing reverse rotation of the toothed sleeve whereby it might become re-engaged with the toothed collar.

According to another embodiment of the invention, a shaft to be driven intermittently, and which may be a type wheel shaft as in the previously described embodiment, has sleeved thereon a continuously driven gear to which is secured a ratchet which is also thereby continuously rotated. Adjacent to the continuously driven ratchet, a stationary ratchet is supported coaxially of the shaft. A coil spring has one end connected to the type wheel shaft, and the other end connected to a plate which is sleeved or journaled on the shaft and which supports two pawls, one being engageable with the continuously rotating ratchet, and the other being engageable with the fixed ratchet. The pawl which is engageable with the continuously rotatable ratchet is secured to a rock shaft which is journaled on the spring supporting plate and which is provided with a depending arm or lug. The other pawl may be secured to the same rock shaft, may be journaled thereon, or may be journaled on an independent support carried by the spring mounting plate. The free end of the lug or arm carried by the rock shaft is disposed between the tines of a forked member that is secured to or is controlled by the type wheel shaft.

The operation of this embodiment of the invention is similar to that of the previously described embodiment. When the type wheel is released for rotation, the spring which is under tension initiates its rotation and the forked member, carried by the type wheel shaft or controlled thereby, shifts the rock shaft lug from one to the other of its two positions whereby the driving pawl is brought into engagement with the continuously rotating ratchet. Positive driving connection from the continuously rotatable ratchet to the spring supporting plate is thus established and rotation is imparted to the type wheel through the helical spring. When the type wheel has been arrested, the driving ratchet continues to rotate the spring supporting plate until the rock shaft lug has moved from one to the other of the two tines of the forked member and has been rocked to disengage the driving pawl from the continuously rotatable ratchet. The continued rotation of the spring supporting plate, after the type wheel has been arrested, results in increasing the tension of the helical spring whereby the torque for initiating the rotation of the type wheel upon the next release thereof is established.

For a complete understanding of the invention, reference may be had to the following detailed description to be considered in the light of the accompanying drawings wherein.

Figure 1:
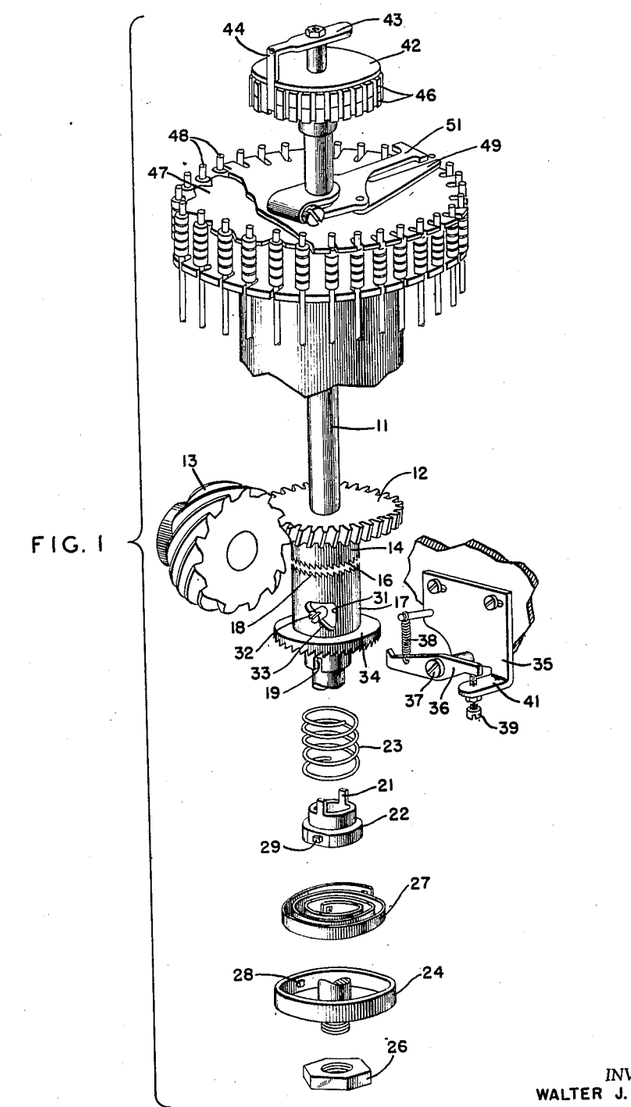
Fig. 1 is an exploded perspective view showing one embodiment of the invention in which the driving and driven elements of the clutch are similarly toothed members.

Referring now to Fig. 1, the reference numeral 11 designates a shaft to which rotation is to be imparted intermittently. Shaft 11 may be supported for rotation in any suitable bearings, and intermediate its ends it supports for free rotation a gear 12. Continuous rotation may be imparted to gear 12 by a motor driven pinion 13 meshing therewith. Gear 12 has secured thereto a collar 14, the free end of which is provided with clutch teeth 16, cut so as to be capable of imparting rotation in one direction only which, according to the disclosure of Fig. 1, is counterclockwise. In close proximity to collar 14, shaft 11 supports a sleeve 17. Sleeve 17 has no direct connection to shaft 11 and it is rotatable independently of the shaft and is also slidable axially thereof. Sleeve 17 is provided with clutch teeth 18 confronting teeth 16 of collar 14 and complementary thereto so that teeth 16 and 18 may become interengaged upon axial movement of sleeve 17 toward collar 14, whereby rotation may be imparted to sleeve 17 by gear driven collar 14.

The end of sleeve 17, opposite to that which carries clutch teeth 18, is reduced in diameter and is provided with key-way slots 19. The slots 19 in sleeve 17 are entered by tongues or keys 21 integral with a bushing 22. Bushing 22 is free to rotate upon shaft 11 and although it is capable of being moved axially of shaft 11, it is caused to seat, by a compression spring 23, one end of which fits over the reduced portion of bushing 22 and abuts the shoulder provided by the reduced portion and the other end which fits over the reduced portion of sleeve 17 and abuts the shoulder provided by the reduced portion, in a cup or coil spring drum 24 which is supported upon the lower end of shaft 11 and is secured thereto by nut 26. Nut 26 clamps drum 24 to shaft 11 so that the drum may rotate only when the shaft rotates.

A coil spring which may be similar to a clock spring, and which is identified by the reference numeral 27, is disposed in drum 24 and is provided with apertures near its inner and outer ends. The aperture in the outer end of spring 27 fits over a lug 28 located internally of drum 24, and the aperture in the inner end of the spring fits over a lug 29 on the periphery of bushing 22, from which it is apparent that shaft 11 is yieldably connected to sleeve 17 through cup or drum 24, spring 27, bushing 22, tongues 21, and slots 19. It will also be observed that compression spring 23 serves the double purpose of seating bushing 22 in cup or drum 24, and of urging sleeve 17 axially of shaft 11 to establish interengagement between clutch teeth 18 and 16.

Intermediate the ends of sleeve 17, the wall thereof is provided with an irregularly shaped aperture 31. A pin 32 supported by shaft 11 extends outwardly therefrom through the aperture 31 in sleeve 17. Pin 32 may be removably secured to shaft 11 by being threaded and entering a tapped hole in shaft 11. Pin 32, in cooperation with aperture 31, determines the amount of relative rotational movement which may occur between shaft 11 and sleeve 17, and also determines the distance which sleeve 17 may move axially of shaft 11. The left-hand end of aperture 31, as viewed in Fig. 1, slopes ascendingly in clockwise direction, the sloping surface being indicated by reference numeral 33. Sloping surface 33 cooperates with pin 32 to operate as a cam, moving sleeve 17 axially of shaft 11 out of engagement with collar 14 when shaft 11 is held stationary while sleeve 17 rotates in counterclockwise direction.

Sleeve 17 is also provided with a ratchet 34 which is arranged to be engaged by a pawl 36 pivoted at 37 to a bracket 35 which is adjustably secured to a portion of the frame of the apparatus by clamping screws passing through elongated apertures in bracket 35. A tension spring 38 biases pawl 36 in clockwise direction and a stop screw 39, carried by an arm 41 of bracket 35, determines the limit of clockwise rotation of pawl 36. The teeth on ratchet 34 are so cut that pawl 36 prevents it from rotating in clockwise direction and, therefore, ratchet 34 and pawl 36 may be designated as check ratchet and check pawl respectively for sleeve 17. The relation of pawl 36, as controlled by stop screw 39 to ratchet 34, is such that when sleeve 17 moves into engagement with collar 14 pawl 36 starts to follow ratchet 34 but is arrested by stop screw 39 before sleeve 17 engages collar 14. Continued axial movement of sleeve 17 until complete engagement with collar 14 is accomplished results in movement of ratchet 34 out of engagement with pawl 36 so that the pawl does not drag upon the ratchet when sleeve 17 is being rotated by gear driven collar 14. When sleeve 17 has been retracted by cooperation of cam surface 33 with pin 32, ratchet 34 is restored to engagement with pawl 36.

Shaft 11 may be any shaft to which rotation is to be imparted intermittently. It may be a shaft which is to be arrested in the same angular position invariably, or it may be arranged to be arrested in any number of positions selectively. In Fig. 1, shaft 11 has been indicated as the type wheel shaft of a selector controlled printing telegraph apparatus. Near its upper end, shaft 11 supports for movement axially thereof a type wheel 42. At the upper end of shaft 11 is secured a bar 43, at one end of which is a depending arm 44. Arm 44 fits into a slot in the periphery of type wheel 42 and establishes driving connections between shaft 11 and the type wheel. Around its periphery, type wheel 42 is provided with type elements 46.

Between type wheel 42 and the driving mechanism for shaft 11, the shaft extends through a code disc selector mechanism which comprises a plurality of permutation code discs 47 and a circular alignment of selectable stop pins 48. As is well-known in the art of printing telegraphy, code discs 47 have their peripheries notched permutatively, and each of these discs is rotatable through a small angular distance whereby it may be presented either in extreme clockwise or counterclockwise position according to the nature of a signaling impulse in correspondence to which it is controlled. For each permutational setting of code discs 47, according to a received signal combination, an alignment of notches across all of the code discs appears opposite one of the selectable stop pins 48 which moves inwardly radially of code discs 47, thus entering the alignment of notches. Stop pins 48 enter the alignment of notches under the influence of springs which bias all of the pins toward the type wheel shaft. Adjacent to the uppermost of the code discs 47, type wheel shaft 11 has secured thereto a stop arm 49, the free end of which just clears all of the stop pins 48 that are held in their outermost positions by code discs 47. Any pin 48 which is selected and falls into an alignment of notches is thereby presented in the path of stop arm 49 and arrests arm 49 and shaft 11 when the arm 49 encounters the selected pin 48. Stop arm 49 has secured thereto a flexible latching arm 51, the free end of which rides over and is lifted by the end of a selected stop pin 48 and drops off ahead of the selected stop pin as stop arm 49 comes into engagement with the pin. Thus, the selected stop pin 48 is confined between stop arm 49 and latching arm 51 and shaft 11 can rotate neither clockwise nor counterclockwise, proper alignment of a printing element 46 with the printing position thus being assured. Shaft 11 may be released for rotation by changing the permutational setting of discs 47 whereby the previously selected stop pin 48 is withdrawn from locking position between arms 49 and 51, and shaft 11 is free to rotate until arrested by the stop pin 48 next encountered.

Rest condition of the type wheel shaft and the clutch mechanism is indicated in Fig. 1. It will be observed that type wheel stop arm 49 is held stationary by a selected stop pin and that sleeve 17 is held out of engagement with collar 14 by cooperation of sloping cam wall 33 with pin 32. It will be understood that since sleeve 17 is out of engagement with collar 14, ratchet 34 is engaged by pawl 36 and is prevented from rotating in clockwise direction. Spring 27 furnishes a torque exerted directly between cup or drum 24 and bushing 22 and, therefore, between sleeve 17 and shaft 11 tending to rotate the shaft in counterclockwise direction and the sleeve in clockwise direction. The amount of torque which spring 27 exerts during rest condition of the apparatus may be varied by removing a pin 32 and while shaft 11 is held stationary, rotating sleeve 17 in counterclockwise direction or permitting it to rotate under the influence of spring 27 in clockwise direction. Counterclockwise rotation of sleeve 17 results in winding or increased tensioning of spring 27 while clockwise rotation results in unwinding or diminished tensioning of the spring. When spring 27 has been properly tensioned, pin 32 may be remounted on shaft 11.

Upon release of stop arm 49 by withdrawal of a selected stop pin 48, the torque furnished by spring 27 becomes effective to initiate the rotation of shaft 11 and type wheel 42. At the instant of release of shaft 11, sleeve 17, having no other rotational tendency than in clockwise direction, which is prevented by pawl 36, undergoes no rotation but moves axially seeking engagement with collar 14 as pin 32 moves away from engagement with cam surface 33. Depending upon the circumferential length of aperture 31 in sleeve 17, pin 32 may or may not come into engagement with the leading end of the aperture before teeth 18 become interengaged with teeth 16. The tendency of spring 27 is to unwind completely, and therefore the spring seeks to maintain engagement between pin 32 and the leading end of aperture 31 during rotation of sleeve 17 by gear 12, and spring 27 is preferably tensioned sufficiently to maintain shaft 11 advanced as far as possible with respect to sleeve 17 during rotation of both.

When stop arm 49 encounters a newly selected stop pin 48, shaft 11 is arrested, and thus the outer end of spring 27 is arrested. Sleeve 17 continues to be rotated by collar 14 and aperture 31 advances in counterclockwise direction with respect to pin 32. The continued rotation of sleeve 17 causes the inner end of spring 27 to revolve about arrested shaft 11, thus winding spring 27 to provide the torque for starting shaft 11 upon the next release thereof. Sleeve 17 continues to be rotated by collar 14 until cam surface 33 engages pin 32 and retracts sleeve 17 from engagement with teeth 16. The rotation of sleeve 17 and therefore its axial movement to disengaged position is positive as long as there is any engagement between teeth 16 and 18. Even after disengagement of teeth 18 from teeth 16 has become complete, inertia of sleeve 17 may cause the sleeve to continue rotating for an instant, whereby a gap will be established between the tops of teeth 16 and 18 so that they shall not rub together during periods of arrestment of sleeve 17, it being remembered that collar 14 is continuously rotatable. Before sleeve 17 becomes completely disengaged from collar 14, its ratchet 34 has become fully engaged by pawl 36. Thus, ratchet 34 will be held against reverse rotation when sleeve 17 comes to rest, and the clutch mechanism comprising collar 14 and sleeve 17 can become active only upon the release of shaft 11 for rotation.

It will be observed from the foregoing description that the positions in which the clutch mechanism may be disabled are not limited to those established by stop pins 48. The disablement of the clutch mechanism results solely from arrestment of shaft 11 and should any interference with the type wheel, its driving shaft or the stop arm result in arrestment of shaft 11 intermediate arrestment positions established by stop pins 48, the clutch mechanism will become disabled in the same manner that it is disabled upon normal arrestment of the shaft. It will also be observed that by providing stop screw 39 for limiting the distance through which pawl 36 is able to follow ratchet 34 when sleeve 17 moves into engagement with collar 14, the ratchet 34 may be moved free of pawl 36 and thus the teeth of ratchet 34 will not scrape over pawl 36 when sleeve 17 is being driven by collar 14.

The amount of clearance between the toothed clutch members when sleeve 17 has come to rest and has been checked by pawl 36 is dependent upon the number of teeth on ratchet 34 relative to the number of arrestment positions for shaft 11, and upon the position of bracket 35 upon its mounting screws. If the number of teeth on ratchet 35 equals the number of arrestment positions for shaft 11, assuming uniform angular distribution of the stopping positions, uniform clutch clearance will be had for all arrestment positions. If under the same circumstances the number of teeth is a multiple of the number of positions of arrestment, uniform separation of the clutch elements may or may not result, depending upon whether the inertia of sleeve 17 causes it to overtravel the same distance after every arrestment of shaft 11. It will be understood that if there is any variation in the angular spacing of the arrestment positions, there must be corresponding variation in the spacing of the teeth, or there must be teeth or blank portions corresponding to those angular positions in which there is no provision for arrestment of the shaft 11, in order to achieve uniform operating clearance.

With reference to the adjustment of bracket 35 upon its mounting screws, it will be apparent that if, while pawl 36 is engaging ratchet 34, bracket 35 be moved in the direction of the major axis of its mounting slots, sleeve 17 will be rotated and by virtue of the engagement of pin 32 with the sloping wall of aperture 31, sleeve 17 will be moved correspondingly along the axis of shaft 11. When bracket 35 is so adjusted that pawl 36 just drops in behind a particular tooth when the inertia of sleeve 17 is spent and the sleeve comes to rest, the operating clearance between the clutch elements will be a maximum. If, then, bracket 35 is backed off so that pawl 36 is retracted a distance less than one tooth, sleeve 17 will return, after overtraveling, until it is checked by pawl 36, and the clearance will be less than maximum.

Figure 2:
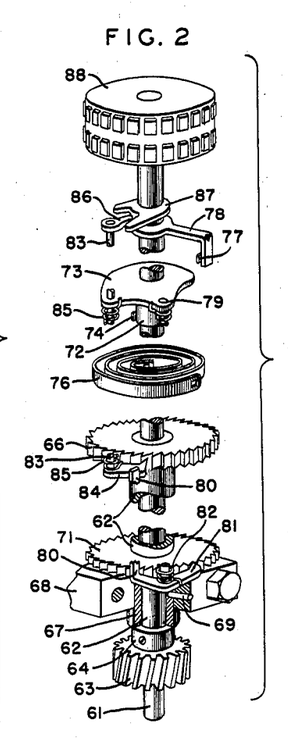
Figs. 2, 3, and 4 are exploded perspective views showing variant embodiments of the invention in which the driving and driven elements of the clutch mechanism are ratchet and pawl respectively.

Referring now to Fig. 2 which discloses a different style of clutch mechanism embodying substantially the same operating principles as those of Fig. 1, the reference numeral 61 designates a shaft upon which a sleeve 62 is rotatably supported. Sleeve 62 is capable of rotating while shaft 61 is at rest. To one end of sleeve 62 a gear or pinion 63 is secured by means of its hub 64. At its opposite end, sleeve 62 has secured thereto a ratchet 66 to which continuous rotation may be imparted by having pinion 63 meshing with a driving motor (not shown).

Intermediate its end, sleeve 62 supports a shorter sleeve 67, the fit between sleeves 62 and 67 being such that sleeve 62 may rotate freely within sleeve 67. Sleeve 67 is externally supported by a clamping block 68 which may comprise separable complementary parts to permit sleeve 67 to be received and clamped. One of the portions of block 68 may carry a pin 69 which enters a recess in sleeve 67 to lock the sleeve to bearing block 68 in order that a ratchet 71, which is fixed to sleeve 67 and is thereby supported adjacent to rotatable ratchet 66, may be held stationary.

Adjacent to rotatable ratchet 66 and on the opposite side thereof from stationary ratchet 71, shaft 61 freely supports for independent rotation a hub 72 to which is secured a plate 73. Hub 72 has on the periphery thereof a lug 74 which receives and retains the apertured inner end of a coil spring 76. The outer end of spring 76 also has an aperture by which the spring is connected to a lug 77, supported near the free end of an arm 78 fixed to shaft 61.

Plate 73 carries a stud 79 upon which is pivoted a pawl 81 which is aligned with stationary ratchet 71 and is biased by torsion spring 82 into engagement with the ratchet. Plate 73 also supports a rock shaft 83 to one end of which is secured a pawl 84 aligned with the teeth of rotatable ratchet 66. At its opposite end rock shaft 83 has secured thereto an arm 86. The free end of arm 86 is disposed between the tines of a forked member 87 secured to shaft 61.

Arm 86 carried by rock shaft 83 is biased by spring 85 in clockwise direction as viewed in Fig. 2, whereby driving pawl 84 tends to be lifted out of engagement with ratchet 66. Check pawl 81 is provided with a laterally projecting arm 80 which extends over pawl 84. Arm 80 serves the dual purpose of limiting the rotation of pawl 84 in clockwise direction, and of enabling pawl 84 to force check pawl 81 into positive engagement with check ratchet 71 when pawl 84 is disengaged from driving ratchet 66.

In the embodiment of the invention shown in Fig. 2, the direction of rotation of the shaft, which imparts rotation to type wheel 88, is clockwise. In the rest condition of the apparatus, shaft 61 is held stationary by any desired type wheel arrestment means, shaft 61 is under torque provided by spring 76 which is under tension, driving pawl 84 is held out of engagement with driving ratchet 66 by the engagement of arm 86 carried by rock shaft 83 with the left-hand or extreme clockwise tine of forked member 87, and plate 73 which carries the pawls is prevented from rotating counterclockwise by engagement of holding pawl 81 with stationary holding ratchet 71 which serves as a backstop for the inner end of coiled spring 76 whereby the spring is enabled to impart a starting torque to shaft 61 through the agency of arm 78.

Upon release of type wheel shaft 61 for rotation, spring 76 initiates the rotation by revolving arm 78. Forked member 87 is also revolved and when its right-hand or extreme counterclockwise tine engages arm 86 of rock shaft 83 and rotates the rock shaft counterclockwise in opposition to its spring 85, driving pawl 84 is brought into engagement with ratchet 66. Thereafter, rotation is imparted by ratchet 66 to plate 73 through pawl 84, and the plate in turn imparts rotation to shaft 61 through spring 76 and arm 78. Spring 76 is adjusted so as to have a predetermined minimum tension whereby it always exerts a torque between plate 73 and shaft 61. When plate 73 is being driven by ratchet 66 and pawl 84, the additional torque imparted to shaft 61 by spring 76 is sufficient to keep the shaft advanced as far as possible with respect to plate 73, so that the right-hand or extreme counterclockwise tine of forked member 87 remains in engagement with arm 86 carried by rock shaft 83. Since check pawl 81 is spring biased for continuous engagement with ratchet 71, the pawl rides over the teeth of the ratchet as it is carried around by plate 73 when the latter is driven by ratchet 66 and pawl 84. It should also be observed that ratchet 66 drives pawl 84 by pushing the pawl ahead of the tooth which it engages, rather than by a hooked engagement and pulling of the pawl as will be the case in embodiments to be described later.

Upon the arrestment of type wheel 88 and shaft 61, spring engaging arm 78 and forked member 87 are also arrested. Plate 73 continues to be rotated by ratchet 66 and rock shaft 83 is advanced with respect to forked member 87 until rock shaft arm 86 engages the extreme clockwise tine of the forked member. After this engagement has been established, continued rotation of plate 73 results in clockwise rocking of shaft 83 whereby pawl 84 is withdrawn from engagement with ratchet 66. Plate 73 thereupon comes to rest and check pawl 81 holds plate 73 against counterclockwise rotation. The continued rotation of plate 73 after shaft 87 has been arrested results in winding or increasing the tension of spring 76, whereby the torque for starting shaft 61 upon the next release thereof is established. The distance through which plate 73 overtravels to effect winding of spring 76, and likewise the distance through which shaft 61 rotates in response to the torque provided by spring 76, is determined by the angular distance between the tines of forked member 87. This angular distance may be great or small, as desired, and it may be made variable, if desired, by arranging forked member 87 so that one of its tines shall be movable about the axis of shaft 61 with respect to the other. Instead of a forked member, two members individually clamped to shaft 61 and each having a single finger to be engaged by rock shaft arm 86 may be provided.

Figure 3:
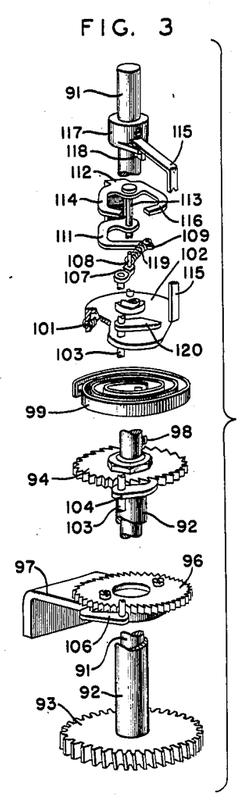

Fig. 3 discloses an alternative embodiment of the power transmitting mechanism shown in Fig. 2. Reference numeral 91 designates the shaft to which intermittent rotation is to be imparted and which may be a type wheel shaft. Shaft 91 supports for free rotation thereon a sleeve 92 to one end of which is secured a gear 93 which may be driven by a motor driven pinion (not shown). To the other end of sleeve 92 is secured a ratchet 94. Shaft 91 and sleeve 92 pass freely through a central clearance aperture in a ratchet 96 which is stationarily mounted in coaxial relation to ratchet 94 by being secured by any desired means, such as screws, to a stationary bracket 97. Ratchet 96 is thus disposed between driving gear 93 and driving ratchet 94.

Shaft 91 has secured thereto a lug 98 which enters an aperture in the inner end of a coil spring 99 and connects shaft 91 to the spring. The outer end of spring 99 is connected to a lug 101 carried by a plate 102, sleeved on the shaft 91. From the relationship of spring 99 to shaft 91 and plate 102, it will be observed that shaft 91 is rotatable in counterclockwise direction, whereas shaft 61 in Fig. 2 was rotatable in clockwise direction.

Plate 102 supports a rock shaft 103, at one end of which are secured two pawls; one being in alignment with and engageable with driving ratchet 94, and the other being aligned with and engageable with stationary ratchet 96. The driving pawl is designated 104 and the check pawl 106. The angular relation between pawls 104 and 106 is such that when either is in engagement with its associated ratchet, the other is held out of engagement with its ratchet.

At the opposite end of rock shaft 103 from that which supports pawls 104 and 106 is secured an arm 107 at the free end of which is a pin 108 extending parallel to the axis of rock shaft 103, and serving as an articulation between arm 107 and a bifurcated link 109. The opposite end of link 109 is pivotally connected to an arm 111 of a three-armed member 112, which is pivotally mounted on a stud 113 carried by plate 102. Member 112 has opposed arms 114 and 116 disposed in a single plane and the arm 111 disposed in a spaced parallel plane. A collar 117 secured to shaft 91 is provided with a blade 18 disposed between the opposed ends of arms 114 and 116 of member 112.

The combination of elements comprising the blade 118, three-armed element 112, and bifurcated link 109 serve the same purpose as forked member 87 in Fig. 2; namely, to shift rock shaft arm 107 from one to the other of its two positions. The relationship of the elements is such that as member 112 is rotated, link 109 must be capable of shifting along its own axis with respect to pin 108 so that the depth of the fork in link 109 must be sufficient to permit this axial movement. A compression spring 119 surrounds link 109 and is compressed between pin 108 and the point of articulation of link 109 with arm 111.

The shifting of rock shaft arm 107 between its two positions is controlled by an overcentering action of link 109. When link 109, in being shifted by three-armed member 112, comes into coincidence with a line between stud 113, upon which member 112 is pivoted, and pin 108, link 109 has been reciprocated a maximum distance with respect to pin 108 and spring 119 is compressed to a maximum extent. As soon as link 109 moves out of this alignment, the direction in which its force is exerted upon pin 108 changes, so that whereas before, the force had been exerted in a direction to resist rocking of shaft 103, the force is now exerted in a direction to cause rocking of shaft 103 and, accordingly, rock shaft arm 108 is rocked by spring 119 to its opposite position immediately and by a snap action. Thus, the time of travel of rock shaft 103 from one to the other of its two positions is not dependent upon the speed of movement of link 109, as is the case in the control of rock shaft lever 86 by forked member 87 in Fig. 2, but the shifting of rock shaft 103 is substantially instantaneous. Thus, although pawls 104 and 106 may be so arranged that at the mid-point of their rocking motion by rock shaft 103, neither may be in engagement with its associated ratchet there can be no long interval during which the pawls may occupy this position. They are snapped from one to the other of their two positions.

Under certain operating conditions, as when the load is heavy, frictional resistance between the driving ratchet and the pawl may prevent spring 119 from rocking shaft 103 to effect disengagement of the pawl. Positive disengagement means has been provided in the form of an arm 115 fixed to collar 117. An arm 120 is secured to rock shaft 103 which carries pawls 104 and 106. The free end of arm 115 is disposed in the circular path of arm 120, and when engaged by the inner or cam surface edge of arm 120, will rock the arm outwardly and thus lift pawl 104 out of engagement with ratchet 94.

Three-armed member 112 constitutes an intermediate member through which shaft 91 controls the establishment of engagement between driving ratchet 94 and pawl 104, and by which it also controls disengagement of the pawl from the ratchet. Blade 118 secured to shaft 91 has a certain freedom of movement between opposed arms 114 and 116 of member 112 just as rock shaft arm 86 has a certain freedom of movement between the tines of forked member 87 in Fig. 2. Also, member 112 has a certain freedom of movement with respect to rock shaft arm 107 before the shifting of the arm is effected, this freedom being represented by the distance which arm 114 must move link 109 before the link passes the dead center position and imparts a torque to the rock shaft arm 107.

The operation of the apparatus shown in Fig. 3 is similar to that disclosed in Fig. 2. The clutch mechanism as shown in Fig. 3 in positive driving engagement pawl 104 being engaged with driving ratchet 94 and check pawl 106 being out of engagement with stationary ratchet 96. Rock shaft arm 107 is in extreme counterclockwise position, as viewed in Fig. 3, link 109 is to the right of a plane passing through pin 108 and stud 113 and blade 118 fixed to shaft 91 is in engagement with arm 116 of three-armed member 112, being maintained in this relation to arm 116 by the normal tension of spring 99.

Upon arrestment of shaft 91, plate 101 continues to be rotated by ratchet 94 in counterclockwise direction, as a result of which arm 116 moves out of engagement with blade 118 and after an interval depending upon the distance between the free ends of arms 116 and 114, the latter comes into engagement with blade 118. After arm 114 engages blade 118, three-armed member 112 is rocked in clockwise direction about its mounting stud 113, due to the fact that its mounting stud 113 continues to revolve about the axis of shaft 91 while the free end of arm 114 is held stationary. Link 109 then begins to move leftwardly toward the plane defined by stud 113 and pin 108, the link 109 also moving axially toward pin 108 whereby spring 119 is compressed. As soon as link 109 crosses the plane defined by stud 113 and pin 108, spring 119 imparts a torque to rock shaft arm 107 through pin 108 and if the frictional resistance between pawl 104 and ratchet 94 is not too great, rotates rock shaft 103 to extreme clockwise position, thus withdrawing pawl 104 from engagement with continuously rotatable ratchet 94 and rocking check pawl 106 into engagement with check ratchet 96. The continued rotation of plate 102 while shaft 91 is held stationary and which terminates when rock shaft 103 is rotated clockwise, results in the winding or increased tensioning of spring 99, whereby a torque is impressed upon shaft 91 which is effective to initiate the rotation of the shaft when it is again released.

If spring 119 is unable to disengage pawl 104 from ratchet 94, it continues to apply the torque to shaft 103 as rock shaft arm 120 approaches arm 115 carried by the then stationary shaft 91. Arm 120, in attempting to pass over the end of arm 115, is cammed outwardly to disable pawl 104, whereupon spring 119 is enabled to engage check pawl 106 with stationary ratchet 96.

When shaft 91 is next released its rotation is initiated by spring 99 and arm 115 is moved free of arm 120. Plate 102 is then at rest because pawl 104 is disengaged from ratchet 94. Blade 118 is carried out of engagement with arm 114 and into engagement with arm 116 and as it continues to rotate it rocks three-armed member 112 in counterclockwise direction about its supporting stud 113. Link 109 is thus moved from left to right and immediately after it crosses the plane defined by pin 108 and stud 113, its compressed spring 119 rocks arm 107 and rock shaft 103 in counterclockwise direction, thus engaging pawl 104 with ratchet 94. Thereafter, rotation is imparted to shaft 91 by ratchet 94 through pawl 104, plate 102, and spring 99.

Figure 4:
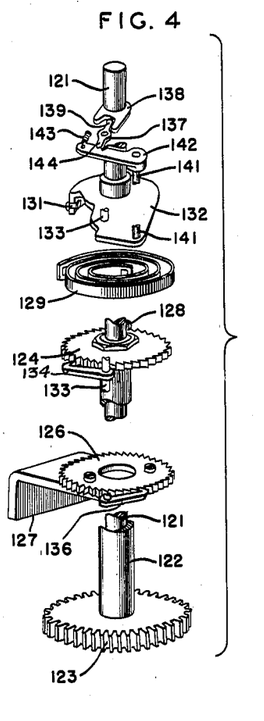

Fig. 4 discloses a power transmitting mechanism which combines certain features of the embodiment shown in Figs. 2 and others of the embodiment shown in Fig. 3. The pawl arrangement is that of Fig. 3 and the pawl controlling arrangement is generally similar to that of Fig. 2. Referring to Fig. 4, the reference numeral 121 designates a shaft to which rotation is to be imparted intermittently. Shaft 121 supports for free rotation thereon a sleeve 122 to one end of which is secured a gear 123 and to the other end of which is secured a ratchet 124. Continuous rotation may be imparted to gear 123 by a motor driven pinion (not shown). A ratchet 126 is secured to a stationary bracket 127 and has a central aperture substantially larger than the diameter of sleeve 122 through which the sleeve and shaft 121 extend in coaxial relation to ratchet 126.

Adjacent to ratchet 124, shaft 121 carries a lug 128 which receives and retains the apertured inner end of a coil spring 129. The outer end of spring 129 is connected to a lug 131 carried by a plate 132 sleeved on shaft 121. Plate 132 supports a rock shaft 133 at one end of which are secured a power transmitting pawl 134 engageable with ratchet 124 and a check pawl 136 engageable with check ratchet 126. Pawls 134 and 136 are secured to rock shaft 133, as in Fig. 3, so that they are alternately engageable with their respective ratchets. The opposite end of rock shaft 133 from that which carries pawls 134 and 136 has secured thereto a lever 137. Lever 137 controls rock shaft 133 and for this purpose has one arm disposed between the tines of a forked member 138. The latter member may be similar to forked member 87 shown in Fig. 2 and it controls lever 137 in the same manner that rock shaft arm 86 in Fig. 2 is controlled. The arm of lever 137, which is disposed between the tines of forked member 138, is designated 139.

Plate 132 is provided with a stud 141 which supports a detent 142. Detent 142 is provided with a pair of notches in one edge and is biased by spring 143 into engagement with the pointed end of arm 144 of lever 137. When lever 137 occupies either of the two positions which it may assume under the control of forked member 138, the pointed end of its arm 144 is disposed in one of the notches in detent 142 and is thereby held in that position. When lever 137 is shifted from one to the other of its positions, the pointed end of its arm 144 rocks detent 142 in counter-clockwise direction by a camming action until the end of arm 144 has passed the apex between the two notches after which spring 143 restores detent 142 to normal position and in so doing it assists in rocking lever 137 into the position which the lever seeks, thus accelerating the shifting of pawls 134 and 136 in a manner corresponding to the acceleration in the shifting of the pawls in Fig. 3, under the control of link 109 and spring 119.

Since the operation of the apparatus shown in Fig. 4 is similar to the operation of previously described embodiments, it will not be described in detail. The principal feature of difference between the apparatus shown in Fig. 4 and others previously described is the addition of detent 142 which assists in the shifting of rock shaft lever 137 after it has passed the mid-point of its travel and which retains the rock shaft lever in either of its positions after it has been shifted. The link 109 and spring 119 in Fig. 3 serve to impress a force upon rock shaft arm 108, whereby it is retained in position after being shifted and also assist in the shifting of the rock shaft arm 108. However, there is an outstanding difference in the manner in which the shifting of the two rock shafts is assisted. In Fig. 3 the rock shaft arm 108 remains stationary while a condition which will later control its shifting is stored. In Fig. 4, the rock shaft lever is moved through substantially one-half of its total angular distance of movement by direct control of shaft 121 and during this initial movement of the rock shaft lever, the detent is conditioned to assist in the shifting and it becomes effective and renders its assistance after the rock shaft lever has passed the mid-point of its travel.

Although certain specific embodiments of the invention have been disclosed and described herein, it will be understood that the invention is not to be interpreted as being limited to such embodiments, but is capable of alteration and modification and of rearrangement and substitution of parts and elements without departing from the spirit of the invention and within the scope of the intended claims.

What is claimed is:

1. In a power transmitting device, a driving element, an element to be driven therefrom under controlled conditions, a positive clutch member associated with said driving element, a positive clutch member associated with said element to be driven and engageable with said first mentioned clutch member, means for disengaging the second mentioned clutch member from the first mentioned clutch member following arrestment of said element to be driven in any position thereof, and means for holding the second mentioned clutch member in the angular position of disengagement and arrestment.

2. In a power transmitting device, a driving element, an element to be driven therefrom, a positive clutch member associated with said driving element, a cooperative positive clutch member associated with said element to be driven, means controlled by the element to be driven for disengaging said clutch members following arrestment of said element to be driven in any angular position, and means for holding the driven clutch member in the angular position of disengagement.

3. In a power transmitting device, a driving element, an element to be driven therefrom, a positive clutch member associated with said driving element, a cooperative positive clutch member associated with said element to be driven, means controlled by said element to be driven for disengaging said clutch members an interval after arrestment of said element to be driven in any angular position, means connected between said driven clutch member and said element to be driven for permitting rotation of one relative to the other, and means co-operating with said driven clutch member for holding said member against rotation with respect to said element to be driven.

4. In a power transmitting device, a shaft to be driven, a continuously operable driving element carried by said shaft, a positive clutch member associated with said element, a cooperative positive clutch member supported by said shaft for independent rotation relative thereto, tension means connected between said shaft and the last mentioned clutch member so as to develop a torque tending to advance said shaft during rotation of said last mentioned clutch member relative to said shaft, and means co-operating with the last mentioned clutch member for holding said member against rotation due to said torque.

5. In a power transmitting device, a shaft to be driven, a continuously operable driving element carried by said shaft, a positive clutch member associated with said element, a cooperative positive clutch member supported by said shaft for independent rotation relative thereto, tension means connected between said shaft and the last mentioned clutch member so as to undergo an increase in tension during rotation of said last mentioned clutch member relative to said shaft, and means for checking said last mentioned clutch member against rotation in a direction to diminish said tension.

6. In a power transmitting device, a shaft to be driven, a continuously operable driving element carried by said shaft, a positive engagement driving clutch member connected to said driving element, a positive engagement driven clutch member supported by said shaft for independent rotation relative thereto, means for urging said driven clutch member into engagement with said driving clutch member, means carried by said shaft for controlling engagement and disengagement of said clutch members, and means interconnecting said shaft and said driven clutch member for causing rotation of said shaft relative to said driven clutch member prior to engagement of said clutch elements and for permitting rotation of said driven clutch member relative to said shaft following arrestment of the shaft.

7. In a power transmitting device, a shaft to be driven intermittently, a continuously operable driving element supported by said shaft, a driving clutch sleeve connected to said driving element and having teeth at its free end, a driven clutch sleeve slidably supported by said shaft for rotative movement with respect thereto and having teeth presented toward the teeth of said driving clutch sleeve, means for shifting said driven sleeve into engagement with said driving sleeve, means carried by said shaft for controlling the disengagement of said driven sleeve from said driving sleeve, means operative upon said driven sleeve during periods of disengagement tending to impart counterrotation to said driven sleeve and means operative upon said driven sleeve when the latter is disengaged from the driving sleeve for holding the driven sleeve against counterrotation.

8. In a power transmitting device, a shaft to be driven intermittently, a continuously operable driving element supported by said shaft, a toothed driving clutch sleeve carried by said driving element, a toothed driven clutch sleeve supported by said shaft for sliding and rotary movement relative thereto, means for shifting said driven clutch sleeve into engagement with said driving clutch sleeve, means carried by said shaft for controlling the disengagement of said driven sleeve from said driving sleeve, means operative upon said sleeve during periods of disengagement tending to impart counterrotation to said driven sleeve, a ratchet secured to said driven sleeve, and a checking pawl engageable with said ratchet.

9. In a power transmitting device, a shaft to be driven, a continuously operable driving element sleeved on said shaft, a toothed driving clutch sleeve carried by said driving element, a toothed driven clutch sleeve supported by said shaft for sliding and rotary movement relative thereto, means for shifting said driven sleeve into engagement with said driving clutch sleeve, means carried by said shaft for controlling the disengagement of said driven sleeve from said driving sleeve, means operative upon said driven sleeve during periods of disengagement tending to impart counterrotation to said driven sleeve, a ratchet secured to said driven sleeve, a pivoted checking pawl engageable with said ratchet, and means for limiting the extent to which the pawl follows the ratchet as driving engagement between the clutch sleeves is established.

10. In a power transmitting device, a shaft to be driven, a continuously operable driving member sleeved on said shaft, a toothed driving clutch sleeve carried by said driving member, a toothed driven clutch sleeve slidably supported on said shaft for rotative movement with respect thereto, means sleeved on said shaft to which said driven clutch sleeve is keyed, means operative between said sleeved means and said driven clutch sleeve for engaging said driven clutch sleeve with said driving clutch sleeve, means carried by said shaft for controlling the disengagement of said driven sleeve from said driving sleeve, and a coil spring having one end connected to said sleeved means and the other end connected to said shaft for exerting a torque between said driven clutch sleeve and said shaft.

11. In a power transmitting device, a shaft to be driven, a continuously operable driving member sleeved on said shaft, a ratchet secured to said driving member, a plate sleeved on said shaft, a pawl pivoted on said plate in cooperative alignment with said ratchet, means carried by said shaft for controlling the relation of said pawl to said ratchet, and yieldable means connecting said plate to said shaft.

12. In a power transmitting device, a shaft to be driven, a continuously operable driving member sleeved on said shaft, a ratchet secured to said driving member, a plate sleeved on said shaft so as to be rotatable with respect thereto, a rock shaft journalled in said plate, a pawl fixed to said rock shaft in cooperative alignment with said ratchet, a lever arm secured to said rock shaft, means carried by said shaft for controlling the operation of said lever arm and thereby of the pawl, and yieldable means interconnecting said plate and said shaft for permitting relative rotational motion therebetween.

13. In a power transmitting device, a shaft to be driven, a continuously operable driving member sleeved on said shaft, a ratchet secured to said driving member, a stationarily mounted ratchet adjacent to the first mentioned ratchet, a plate sleeved on said shaft, pawls carried by said plate, one in cooperative alignment with each of said ratchets, said first mentioned ratchet and associated pawl being effective to impart rotation to said plate and said second mentioned ratchet and associated pawl being effective to check said plate against counterrotation, and spring means interconnecting said plate and said shaft.

14. In a power transmitting device, a shaft to be driven, a continuously operable driving member sleeved on said shaft, a ratchet secured to said driving member, a stationarily mounted ratchet disposed coaxially with respect to the first mentioned ratchet, a plate sleeved on said shaft, a rock shaft carried by said plate, pawls secured to said rock shaft, one in cooperative alignment with each of said ratchets and disposed angularly with respect to each other so as to engage their respective ratchets alternately, a lever arm secured to said rock shaft, means controlled by said shaft to be driven for rocking said lever arm between two positions to control said pawls, and yieldable means interconnecting said plate and said shaft to be driven.

15. In a power transmitting device, a shaft to be driven, a continuously operable driving member sleeved on said shaft, a ratchet secured to said driving member, a plate sleeved on said shaft, a rock shaft supported by said plate, a pawl secured to said rock shaft in position to engage said ratchet for imparting rotation to said plate, a lever arm also secured to said rock shaft, means controlled by the shaft to be driven for rocking said lever arm between two positions to control said pawl in relation to said ratchet, means for detenting said lever arm in either of the two positions, and a coil spring connecting said shaft to be driven to said plate.

16. In a power transmitting device, a shaft to be driven, a continuously operable driving member sleeved on said shaft, a ratchet secured to said driving member, a plate sleeved on said shaft, a coil spring having one end connected to the shaft and the other end connected to the plate and arranged to have its tension increased upon forward rotation of said plate relative to said shaft, a rock shaft carried by said plate, a pawl secured to said rock shaft in position to engage said ratchet for imparting rotation to said plate, a lever arm also secured to said rock shaft, a member pivoted on said plate, an over-center link interconnecting said pivoted member and said lever arm for moving said lever arm between two positions for controlling said pawl, and means on said shaft to be driven for controlling said pivoted member.

17. In a power transmitting device, a shaft to be driven, a continuously operable driving member sleeved on said shaft, a ratchet secured to said driving member, a plate sleeved on said shaft, a coil spring having one end connected to the shaft and the other end connected to the plate for imparting rotation from the plate to the shaft, a rock shaft carried by said plate, a pawl secured to said rock shaft in position to engage said ratchet for imparting rotation to said plate, a lever arm also secured to said rock shaft, a pivoted member carried by said plate having a single arm and a pair of opposed arms, an over-center link disposed in operative engagement with said lever arm and the single arm of said pivoted member, and means secured to the shaft to be driven and disposed between the opposed arms of the pivoted member for engagement with either arm to control said pawl.

18. In a power transmitting device, a shaft to be driven, a continuously operable driving member sleeved on said shaft, a ratchet secured to said driving member, a plate sleeved on said shaft, a coil spring interconnecting said shaft and said plate, a rock shaft supported by said plate, a pawl secured to said rock shaft in position to engage said ratchet for imparting rotation to said plate, a lever arm secured to said rock shaft, and a forked member under the control of the shaft to be driven for moving said lever arm from one position to another to control accordingly said pawl.

19. In a power transmitting device, a shaft to be driven, a continuously operable driving member sleeved on said shaft, a ratchet secured to said driving member, a plate sleeved on said shaft, yieldable means interconnecting said shaft and said plate, a pawl secured to said rock shaft in position to engage said ratchet for imparting rotation to said plate, a lever arm secured to said rock shaft, and a forked member carried by said shaft to be driven and having its arms disposed on opposite sides of said lever arm to engage said lever arm alternately for controlling accordingly said pawl.

20. In a power transmitting device, a shaft to be driven, a continuously operable driving member sleeved on said shaft, a ratchet secured to said driving member, a stationarily mounted ratchet disposed adjacent to and coaxially of the first mentioned ratchet, a plate sleeved on said shaft, spring means interconnecting said plate and said shaft, a plurality of pawls pivoted independently on said plate and engageable individually with said ratchets, means under the control of the shaft to be driven for controlling the pawl associated with the first mentioned ratchet, and means for steadily urging the other pawl into engagement with the stationarily mounted ratchet.

21. In a power transmitting device, a shaft to be driven, a continuously operable driving member sleeved on said shaft, a ratchet secured to said driving member, a stationarily mounted ratchet disposed adjacent to and coaxially of the first mentioned ratchet, spring means interconnecting said plate and said shaft, a driving pawl and a check pawl pivoted independently on said plate and engageable with the first mentioned ratchet and the stationarily mounted ratchet respectively, means under control of the shaft to be driven for controlling the engagement and disengagement of the driving pawl with respect its ratchet, means for biasing the check pawl to seek engagement with the stationarily mounted ratchet, and means associated with the driving pawl for positively engaging the check pawl with its ratchet upon disengagement of the driving pawl.

22. In a printing telegraph apparatus, a type wheel, a carrier to which said type wheel is secured, clutch means for imparting rotation to said carrier, means for selectively arresting said carrier in various angular positions, means controlled by said carrier for disengaging said clutch means after the arrestment of said carrier, and means connected between said clutch means and said carrier and conditioned during the interval between arrestment of said carrier and disengagement of said clutch means for applying to said carrier a starting torque prior to the engagement of said clutch means.

23. In a printing telegraph apparatus, a type wheel, a carrier to which said type wheel is secured, clutch means comprising driving and driven elements for imparting rotation to said carrier, means for selectively arresting said carrier in various angular positions, means controlled by said carrier for disengaging said driven element from said driving element an interval after the arrestment of said carrier, means connected between said driven clutch element and said carrier and conditioned during said interval for applying to said carrier a starting torque prior to the engagement of said clutch means, and means cooperating with said driven clutch element for checking it against dissipation of said starting torque while said carrier is arrested.

24. In a printing telegraph apparatus, a type wheel, a shaft carrying said type wheel, a clutch means comprising driving and driven elements for imparting rotation to said shaft, means for selectively arresting said shaft and type wheel in various angular positions, means for causing the disengagement of said clutch means subsequent to the arrestment of said shaft and type wheel, an energy storing means connected between said shaft and said clutch means and charged with energy during the interval in which said clutch means remains engaged after the arrestment of said shaft, said energy storing means providing a starting torque to rotate said shaft when said shaft is free for rotation and while said clutch means remains disengaged, and means controlled by the rotation of said shaft to cause the engagement of said clutching means.

WALTER J. ZENNER.